United States Patent
Mayernick

(10) Patent No.: US 12,096,777 B1
(45) Date of Patent: Sep. 24, 2024

(54) METHOD AND APPARATUS FOR BAKING POCKET BUN

(71) Applicant: Robert Mayernick, South Bend, IN (US)

(72) Inventor: Robert Mayernick, South Bend, IN (US)

(73) Assignee: Robert Mayernick, South Bend, IN (US)

( * ) Notice: Subject to any disclaimer, the term of this patent is extended or adjusted under 35 U.S.C. 154(b) by 0 days.

(21) Appl. No.: 18/524,389

(22) Filed: Nov. 30, 2023

(51) Int. Cl.
| | |
|---|---|
| *A47J 43/20* | (2006.01) |
| *A21B 3/13* | (2006.01) |
| *A21B 5/02* | (2006.01) |
| *A21D 8/06* | (2006.01) |
| *A21D 13/33* | (2017.01) |
| *A23P 30/10* | (2016.01) |
| *A47J 9/00* | (2006.01) |

(52) U.S. Cl.
CPC .............. *A21B 3/134* (2013.01); *A21B 5/026* (2013.01); *A21D 8/06* (2013.01); *A21D 13/33* (2017.01); *A23P 30/10* (2016.08); *A47J 43/20* (2013.01); *A47J 9/007* (2013.01)

(58) Field of Classification Search
CPC .. A47J 9/007; A47J 43/20; A21B 5/02; A21B 5/026; A22C 7/003; A23P 30/10; B22C 9/24

USPC .......... 99/441, 442, 428; 425/117, 118, 123; 249/57, 63, 64, 142, 144, DIG. 1
See application file for complete search history.

(56) References Cited

U.S. PATENT DOCUMENTS

| | | | | |
|---|---|---|---|---|
| 557,685 | A * | 4/1896 | Mains | 249/144 |
| 692,919 | A * | 2/1902 | Schaumloeffel | 249/144 |
| 818,727 | A * | 4/1906 | Wiltrout | 249/144 |
| 5,851,564 | A * | 12/1998 | Triandafilou | B29C 33/0033 425/432 |
| 8,870,151 | B1 * | 10/2014 | Mayernick | A21D 8/06 249/176 |

* cited by examiner

*Primary Examiner* — Reginald Alexander
(74) *Attorney, Agent, or Firm* — Sanders Pianowski LLP

(57) ABSTRACT

A method and apparatus is provided for baking a pocketed bun having a mold base and separable housing. The mold base has a male mold with an outside profile shape that vertically protrudes above the base. The housing has a ring around a central opening that receives and seals to the male mold when assembled, forming a chamber with an open top to receive liquid dough. The housing can either be a single piece or separable into two parts. The method of baking a pocketed bun with the mold base and separable housing starts with assembling the mold base and housing, filling the chamber through the open top, baking the pallet, then removing the housing from the mold base. The removal of the housing causes the ring to strip the pocketed bun from the mold base.

19 Claims, 13 Drawing Sheets

METHOD AND APPARATUS FOR BAKING POCKET BUN

BACKGROUND OF THE INVENTION

The present disclosure relates to the manufacturing of baked goods. Baked bread products, such as hamburger or hot dog buns are commonplace but do not handle some toppings very well. When trying to eat a hot dog or burger with toppings, they frequently spill out and make a mess. At sporting events, in the car, or at picnics, where foods like these are typically served or consumed, there is limited access to handwashing and messes are much harder to clean. Therefore, there is a need to have a bun or baked good that can act as an edible bun container that also reduces mess. Mass production of edible bun containers can be challenging, given that baked bread doesn't have the rigidity as other edible bun containers, such as ice cream cones. This challenge is increased by the aspect ratio of the edible bun container. A long and narrow bun container is difficult to remove from a baking mold. An improved device is needed.

SUMMARY OF THE INVENTION

The present disclosure describes an apparatus and process for mass production of baked goods. The process uses a pallet that is made up of a mold base and either a clamshell or sleeve housing. The mold base has a male mold portion that may be tapered. The mold base may include a biasing member that is spaced from the male mold and moveable between a resting position and a biased position.

The clamshell housing has a first side and a second side and can be mated to the mold base. The first side is pivotable with respect to the second side between an open position and a closed position. The first side having a bottom edge, a top edge, and longitudinal edges extending between the bottom and top edges. The first side also has a wall that extends between the edges and has a mold-facing surface. The first side has a ring wall that protrudes from the mold-facing surface and extends across from one of the longitudinal edges to the other longitudinal edge. The ring wall terminates at a side sealing surface. The second side is identical or a mirror image of the first side. The clamshell housing, in the closed position forms a partially enclosed volume with a top opening at the top edges and a bottom opening at the bottom edges. The closed position is defined by the first side contacting the second side along the longitudinal edges and the bottom edges of the sides being coplanar. The open position is defined by the first side being pivoted away from the second side and the bottom edges of the sides being angled with respect to each other. When the clamshell housing is mated to the mold base, both of the sides are located between the biasing member and the male mold.

The sleeve housing uses a mold base having a base plate with a male mold protruding from the base plate. The sleeve housing has a bottom edge defining a bottom opening, a top edge defining a top opening, and a wall extending between the top and bottom edges. The wall has a mold-facing surface and a ring wall protruding from the mold-facing surface. The sleeve housing forms a partially enclosed volume with a top opening at the top edge and a bottom opening at the bottom edge. When the housing is mated to the mold base, the male mold is received by the bottom opening and the housing is sealed to the male mold adjacent to the base plate.

The baking process for baking an edible bun container starts by providing a mold base having a base plate with a male mold protruding therefrom that terminates at an end wall. Next, a housing is provided having a top opening and a ring wall. Next, mating the housing to the mold base to seal the ring wall to the male mold, thereby forming a pallet having a chamber with an open top. Next, dispensing a preselected amount of liquid dough into the chamber. The pallet is then baked to convert the dough to a pocketed bun container. The housing is then removed from the mold base to strip the pocketed bun container from the male mold. Lastly, the pocketed bun container is separated from the housing. For the clamshell housing, the open position releases the bun container. For the sleeve housing, the housing is inverted, allowing the bun container to be removed.

DESCRIPTION OF THE PREFERRED EMBODIMENT

Figure 1:
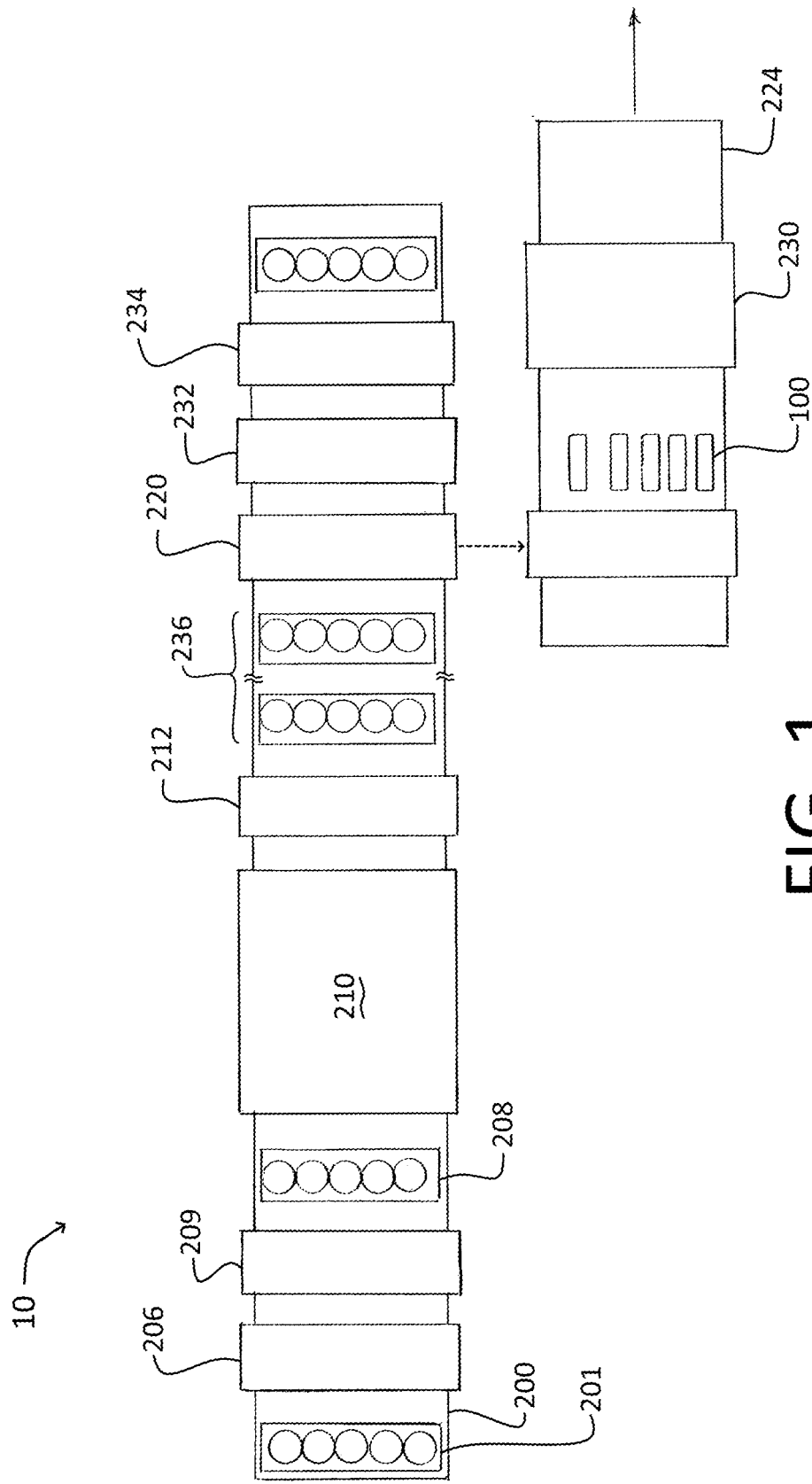
FIG. 1 is an overview of a manufacturing process for an edible bun container.
Figure 7:
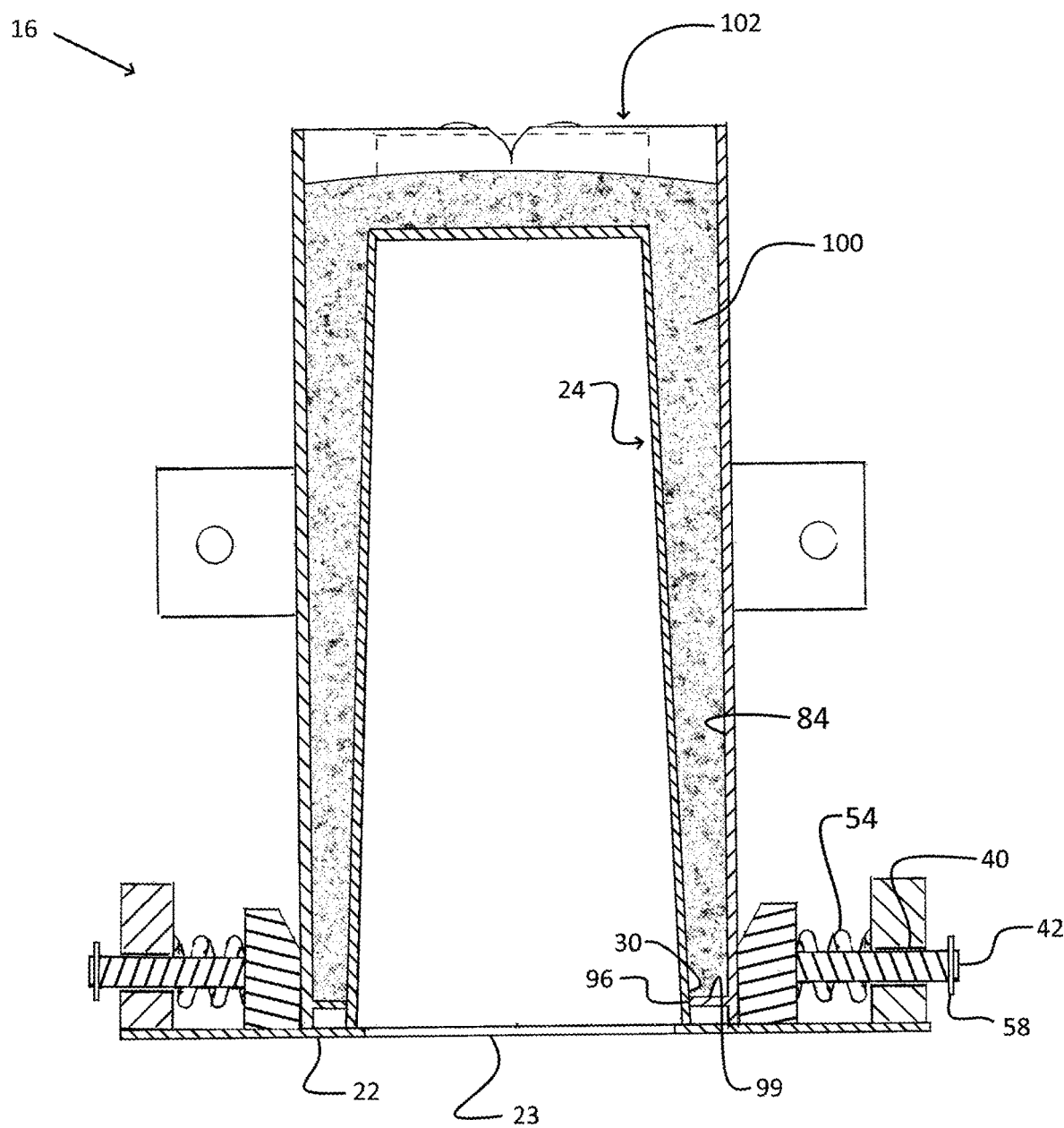
FIG. 7 is a side section view 6-6 of the assembled pallet in FIG. 3 with a baked pocketed bun container.
Figure 8:
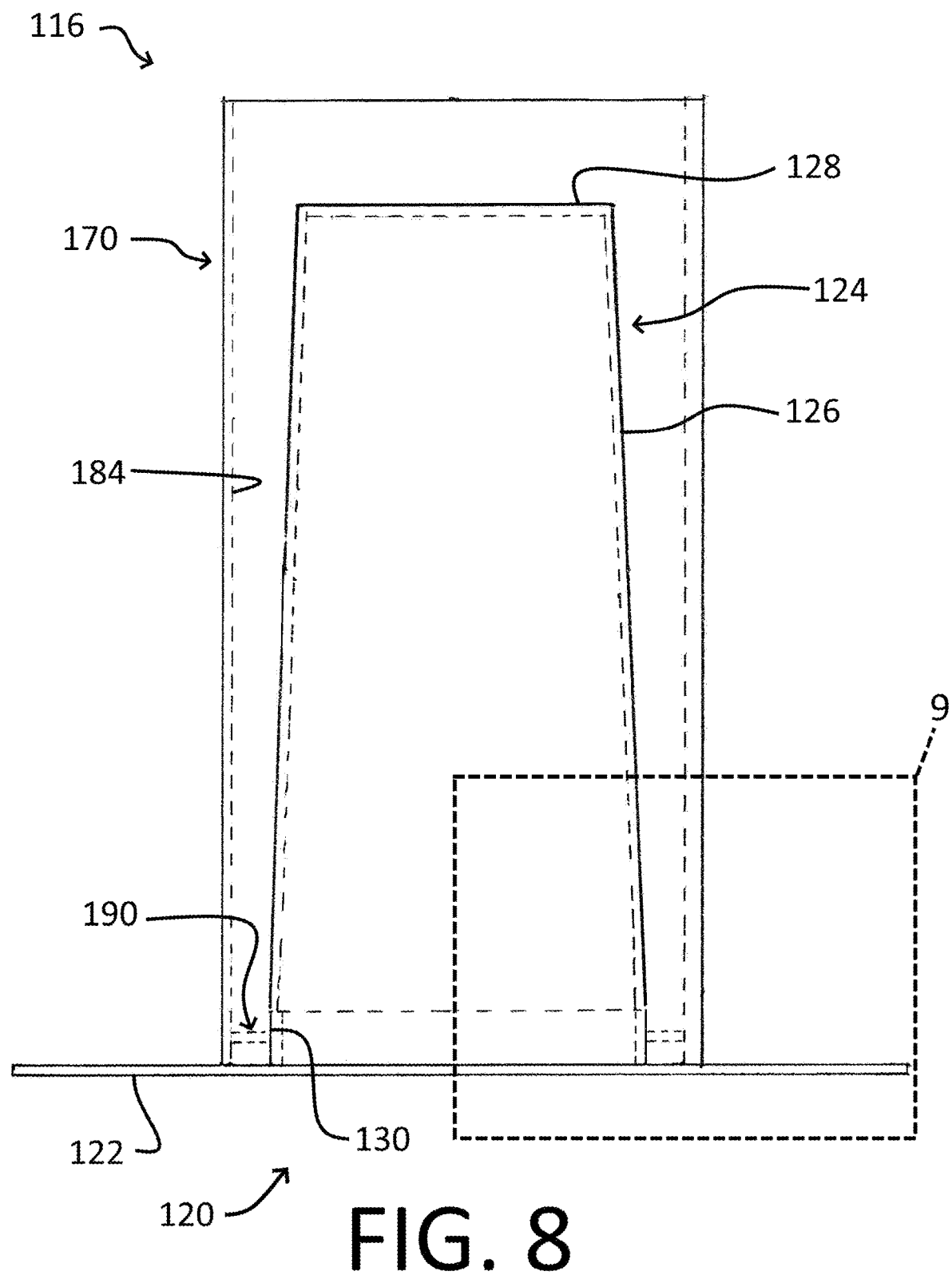
FIG. 8 is a side view of an assembled pallet with a sleeve housing.

A process 10 for baking an edible pocketed bun container 100 is shown in FIGS. 1 and 7. The process 10 uses a pallet 16 (shown in FIG. 2) or pallet 116 (shown in FIG. 8). The pallet 16 has a mold base 20 (shown in FIG. 5) and clamshell housing 70 (shown in FIG. 4). As shown in FIG. 8, pallet 116 has a mold base 120 and sleeve housing 170.

Figure 2:
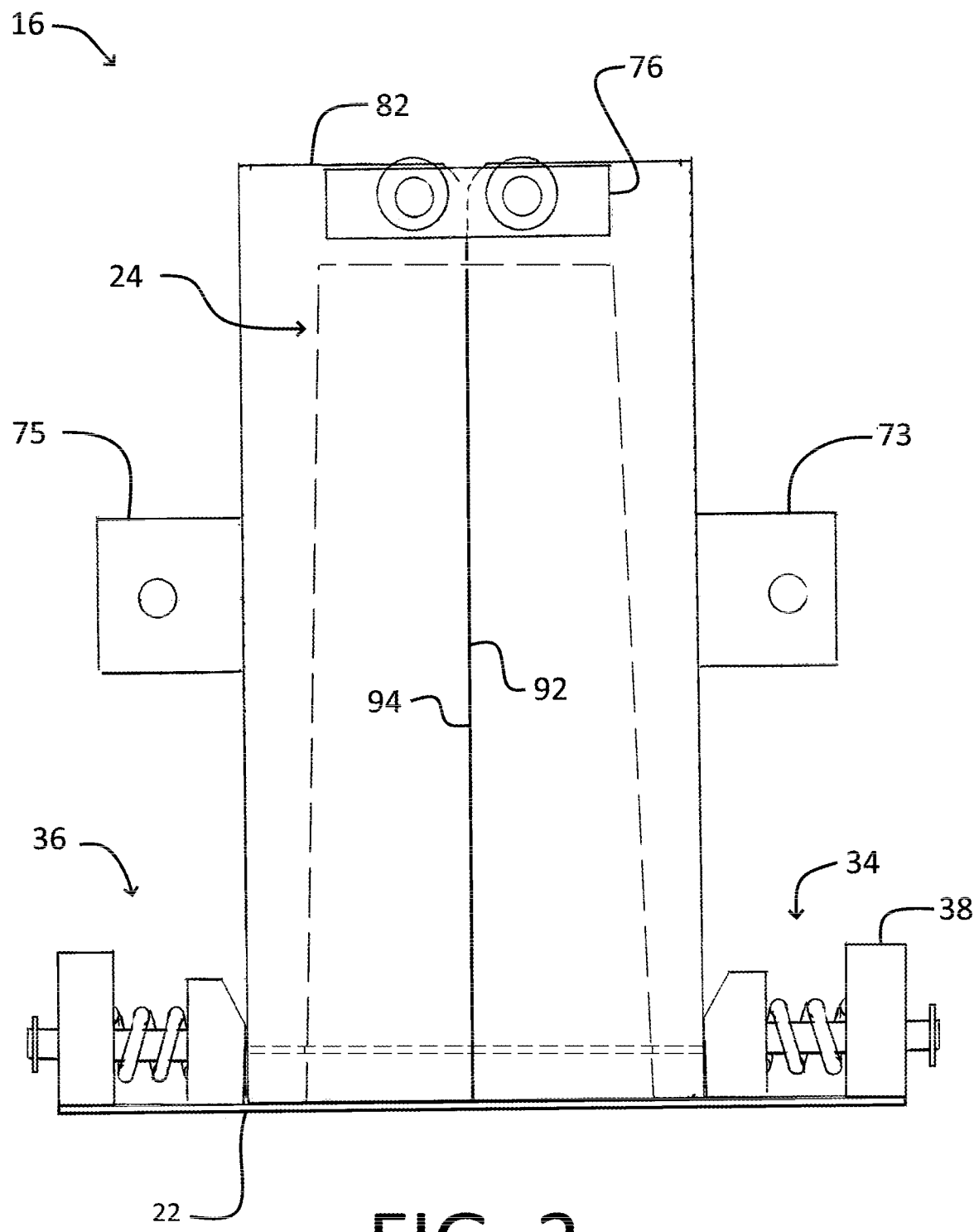
FIG. 2 is a side view of an assembled pallet with a clamshell housing.
Figure 3:
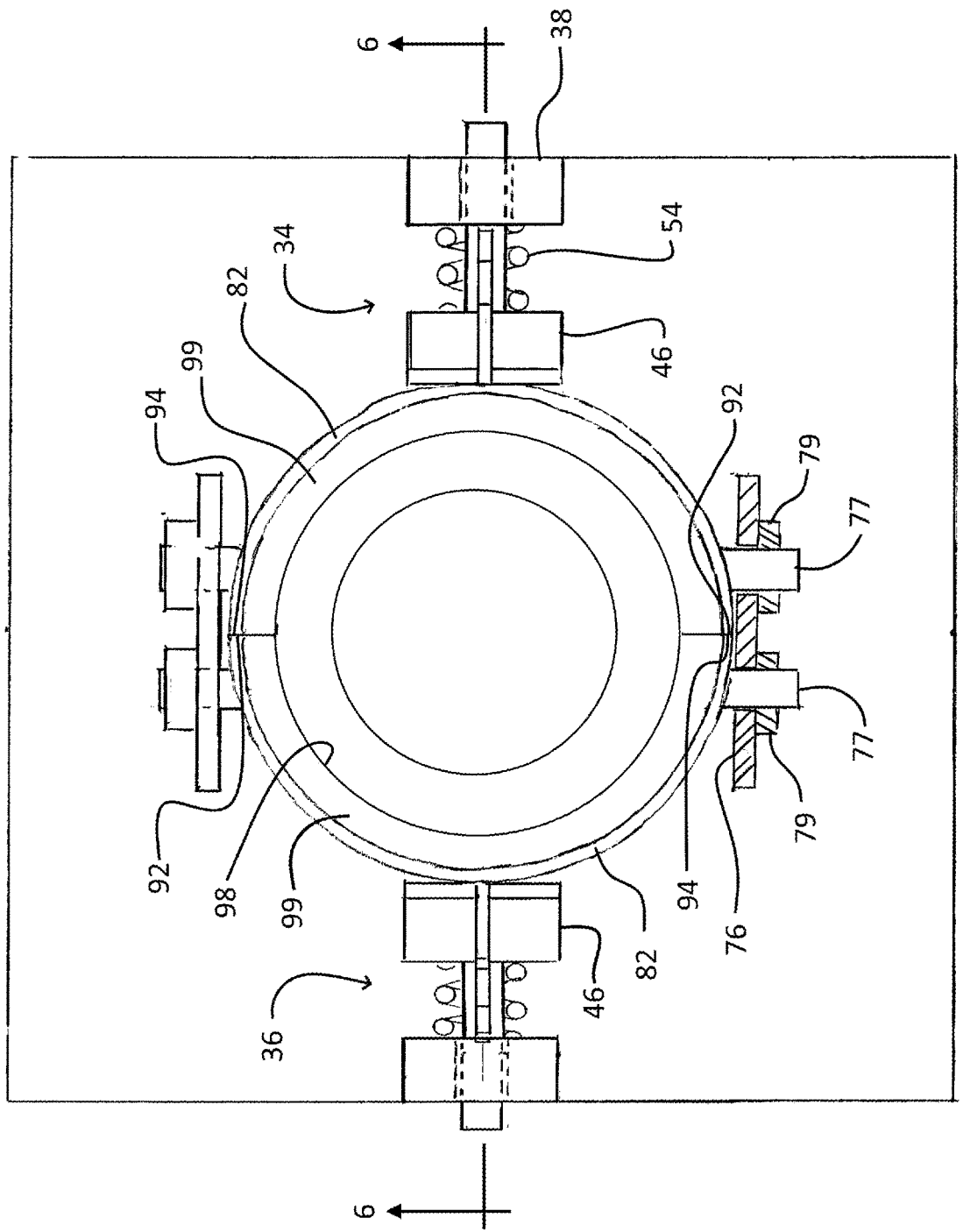
FIG. 3 is a top view of the assembled pallet in FIG. 2.
Figure 5:
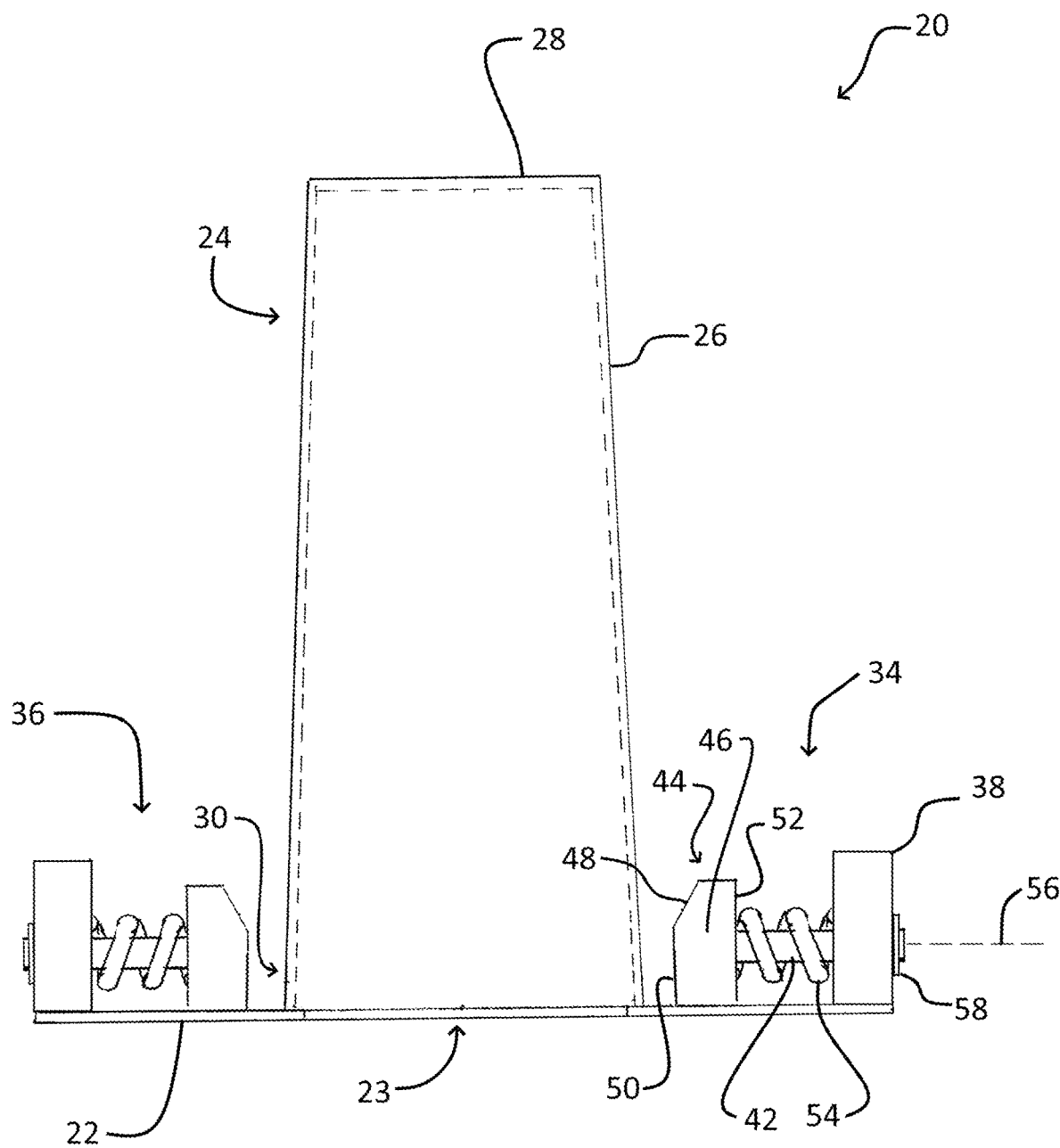
FIG. 5 is a side view of the mold base of the assembled pallet in FIG. 2.

As shown in FIG. 5, the mold base 20 has a base plate 22 that may include other features (not pictured) that can be used for automation, machine fixturing, or other process aids. A male mold 24 extends from the base plate 22 with a side wall 26 that terminates at an end wall 28. While the end wall 28 is shown as flat, it can be any shape. An aperture 23 through the base plate 22 assists with heat transfer to the male mold 24. As pictured, the side wall 26 is tapered (or frustoconical) but a straight cylinder or other shapes are contemplated. The outside surface of the male mold 24 may be coated with a non-stick material to aid the release of the bun container 100 after baking. The male mold 24 can have any exterior shape or cross-sectional profile, provided that a baked good, such as pocketed bun container 100 can be removed in a direction away from the base plate 22. In other words, the male mold 24 can be straight or tapered, but the cross-sectional shape should be consistent along the entire length of the male mold 24. A scaling region 30 is located on the side wall 26 close to or adjacent the base plate 22. This is shown in FIG. 5. The sealing region 30 may be a portion of the side wall 26 that is straight, tapered, or otherwise shaped to seal against an area of the clamshell housing 70. Attached to the base plate 22 are biasing devices 34, 36. As shown, the biasing devices 34, 36 are identical so only one biasing device will be described in detail. As shown in FIGS. 5 and 7, biasing device 34 has a fixed block 38 that is attached directly to the base plate 22. The fixed block 38 has an aperture 40 that receives a guide shaft 42 that is part of the moving portion 44. In addition to the guide shaft 42, the moving portion 44 includes a guide block 46. The guide block 46 is affixed to the guide shaft 42 and has a lead-in surface chamfer 48 that meets a holding surface 50. The guide block 46 has a backstop 52 where a spring 54 applies force. As shown in FIGS. 2 and 3, spring 54 is located on the guide shaft 42 between the fixed block 38 and guide block 46. The guide shaft 42 extends through the fixed block 38 and may contain a clip 58, stop, or other feature to prevent overtravel of the moving portion 44 when the clamshell housing 70 is absent. As shown, the moving portion 44 slides along a central axis 56 between a resting position, shown in FIG. 5 and a biased position, shown in FIG. 2. In the resting position, the spring 54 is less compressed and exerting less force between the fixed block 38 and the guide block 46. A clip 58 or other component to prevent overtravel may be in biased contact with the fixed block 38. In the biased position, the spring 54 is more compressed and the guide block 46 is closer to the fixed block 38. The presence of the clamshell housing 70 moves the guide blocks 46 from the resting position to the compressed position.

Figure 4:
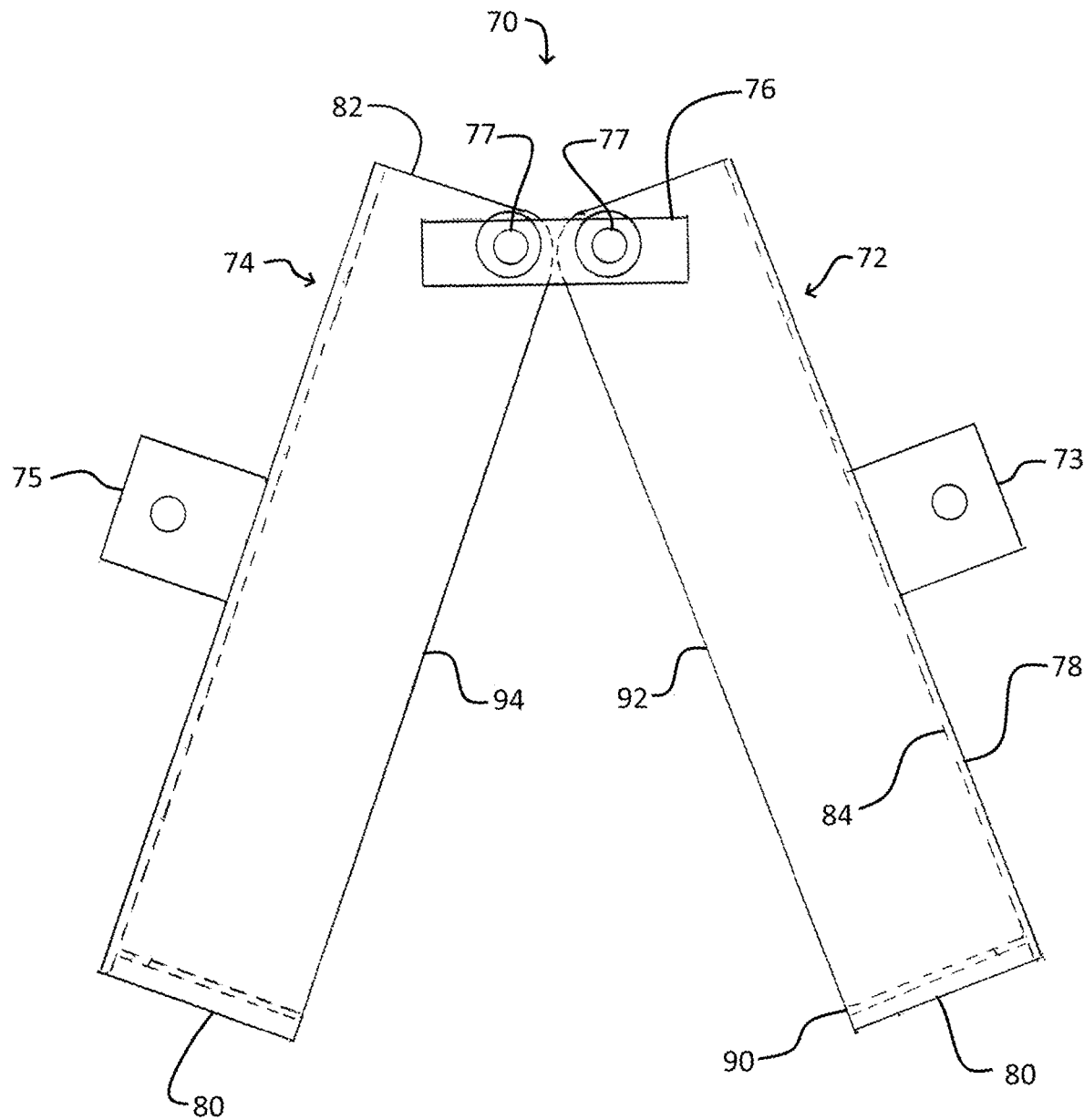
FIG. 4 is a side view of the clamshell housing in the open position.
Figure 6:
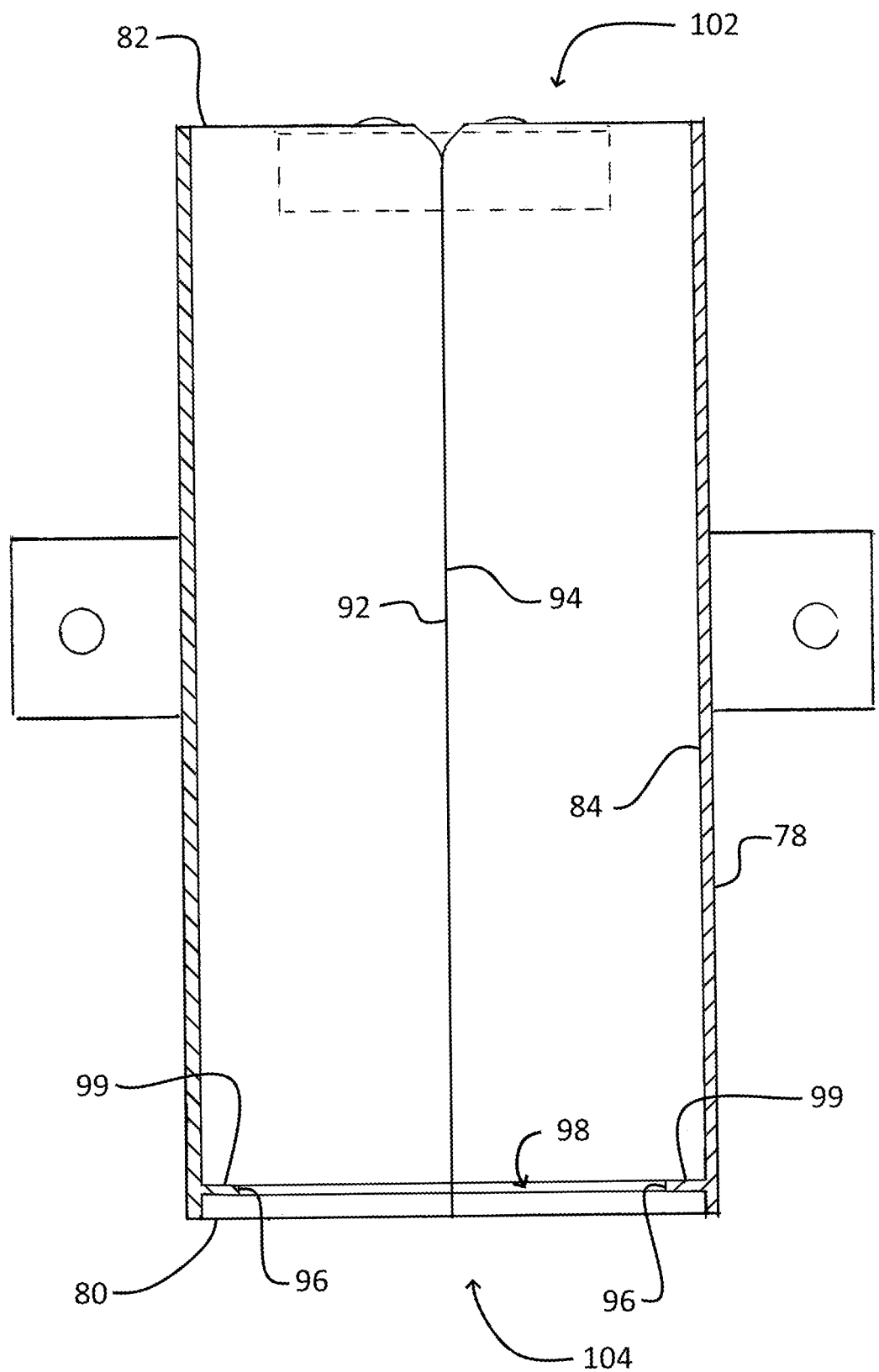
FIG. 6 is a side section view 6-6 of the clamshell housing in FIG. 3.

The clamshell housing 70 has a first side 72 and a second side 74 that are connected by a rotating pin lock 76. The sides 72, 74 have rotating shafts 77 that receive the pin lock 76. The pin lock 76 and shafts 77 are held together with retainers 79, shown on FIG. 3. The rotating pin lock 76 allows the sides 72, 74 to pivot with respect to each other between an open position as shown in FIG. 4 and a closed position as shown in FIG. 6. External equipment connects to actuating wings 73, 75 to move the clamshell housing 70 between positions. As shown, the sides 72, 74 are identical so only one side will be described in detail. Side 72 is formed from a continuous wall 78 that extends from a bottom edge 80 to a top edge 82. An inside surface 84 of the wall 78 may be coated with a non-stick material to aid the release of the bun container 100 after baking. The wall 78 includes an ejection and guide half ring wall 90 that extends outwardly from the inside surface 84. For each side 72, 74, the half ring wall 90 extends across the wall 78 between a first longitudinal edge 92 and second longitudinal edge 94 such that when the clamshell housing 70 is in the closed position, the half ring walls 90 for each side meet to form a continuous wall, shown in FIGS. 3 and 6. The half ring wall 90 has a side sealing surface 96 that is located on the edge of the half ring 90. The upward facing surface 99 of the half ring 90 is also coated with a non-stick material.

As previously disclosed, the clamshell housing 70 is moveable between an open position and a closed position. In the closed position, the longitudinal edges 92, 94 of one side 72, 74 contact the longitudinal edges of the other side 74, 72 to form a tube with a top opening 102 at the top edges 82 and a bottom opening 104 at the bottom edges 80. The longitudinal edges 92, 94 seal against each other. It is contemplated that the longitudinal edges 92, 94 include guide features (such as tongue-and-groove) and gaskets or seals to ensure alignment and proper sealing between them. As shown in FIG. 6, when the clamshell housing 70 is closed, the bottom edges 80 are coplanar, the sealing surfaces 96 form a sealing profile 98 from sealing surfaces 96 that match the profile of the sealing region 30 on the male mold 24. In the open position, the bottom edges 80 of the sides 72, 74 are spaced apart and angled with respect to each other.

The clamshell housing 70 can be mated to the mold base 20 as shown in FIGS. 2 and 7. As shown in FIG. 7, the side sealing surface 96 seals against the sealing region 30 of the male mold 24. The sides 72, 74 are biased towards the closed position by the biasing devices 34, 36. The chamfers 48 allow the clamshell housing 70 to be mated to the mold base 20 when the clamshell housing 70 is at or near the closed position to form the clamshell style pallet 16. "Near the closed position" is defined by a small or negligible gap between the longitudinal edges 92, 94 near the bottom opening 104 that can be accommodated by the biasing devices 34, 36. For clarity, any separation of the sides 72, 74 cannot be so large that the sides 72, 74 collide with the moving portions 44 thereby preventing the bottom edges 80 from contacting the base plate 22. The bottom opening 104 is closed off with the mold base 20, leaving only the top opening 102. This forms a chamber to receive liquid dough or batter with the top opening 102 being an open top to that chamber.

The process 10 is described below in greater detail, but in this position, batter or liquid dough can be added through the top opening 102 and the assembly is baked together.

The sealing of the longitudinal edges 92, 94 and the sealing profile 98 to the scaling region 30 is not required to be airtight but still has to seal sufficiently to prevent leakage of the batter or liquid dough. After baking, the pocketed bun container 100 is stripped from the mold base 20 when the clamshell housing 70 is lifted off of the mold base 20. The half ring walls 90 strip the bun container 100 from the male mold 24. The sides 72, 74 are pivoted to the open position, and the bun container 100 is released.

A sleeve design is shown in FIGS. 8-13. Mold base 120, shown in FIG. 8, has some of the features of mold base 20, such as a base plate 122, and a male mold 124 having a side wall 126 and end wall 128. The outside surfaces of the male mold 124 are coated with a non-stick material to aid in releasing the bun container 100 after baking. As opposed to mold base 20, the male mold 124 has a sealing region 130 that may be straight (not tapered). The scaling region 130 is close to or adjacent to the base plate 122.

Figure 9A:
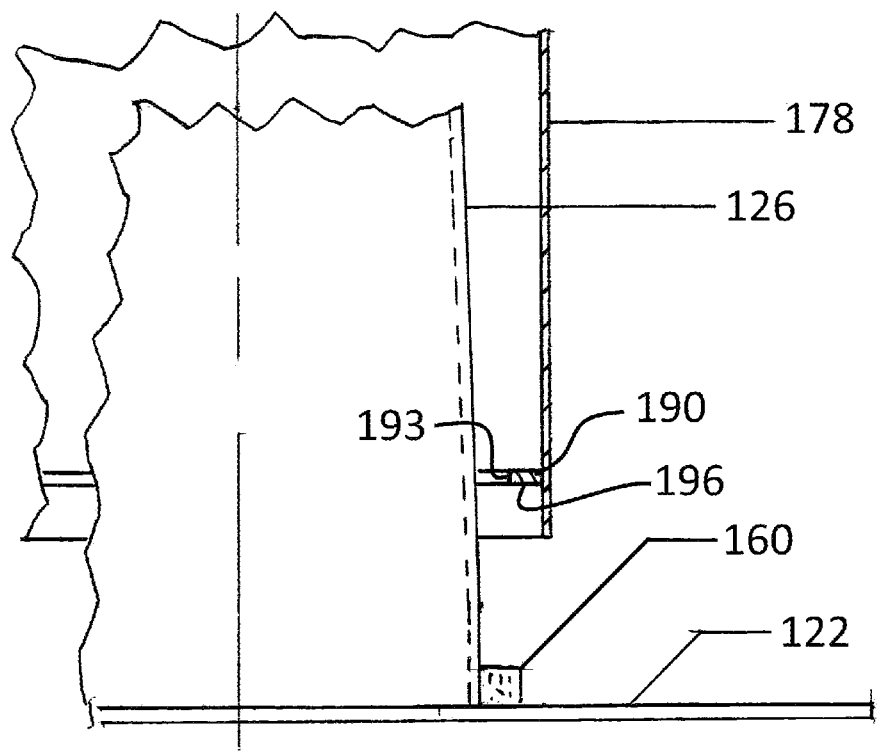
FIG. 9A is a partial section view 9 of the assembled pallet in FIG. 8 before the sleeve housing is fully mated to the mold base.
Figure 9B:
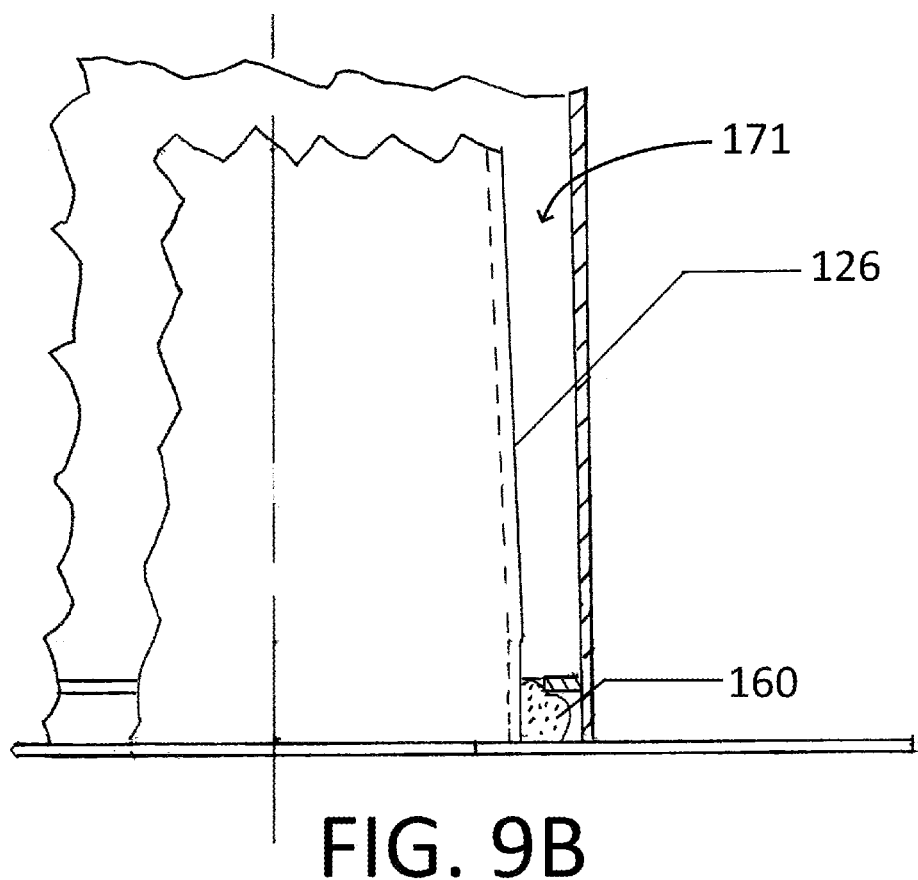
FIG. 9B is a partial section view 9 of the assembled pallet in FIG. 8 after the sleeve housing is fully mated to the mold base.
Figure 12:
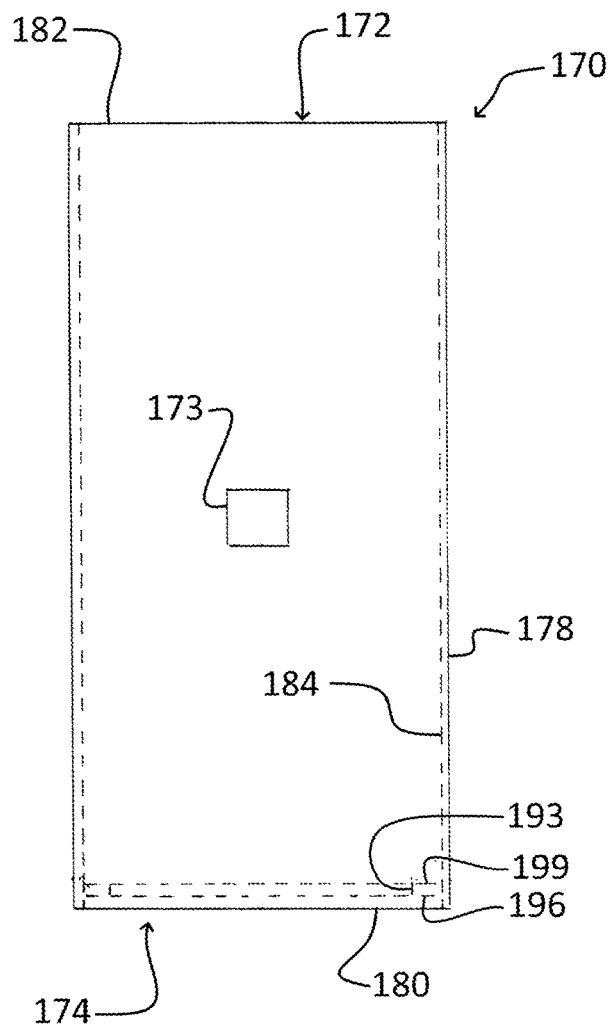
FIG. 12 is a side view of the sleeve housing of the assembled pallet in FIG. 8.
Figure 13:
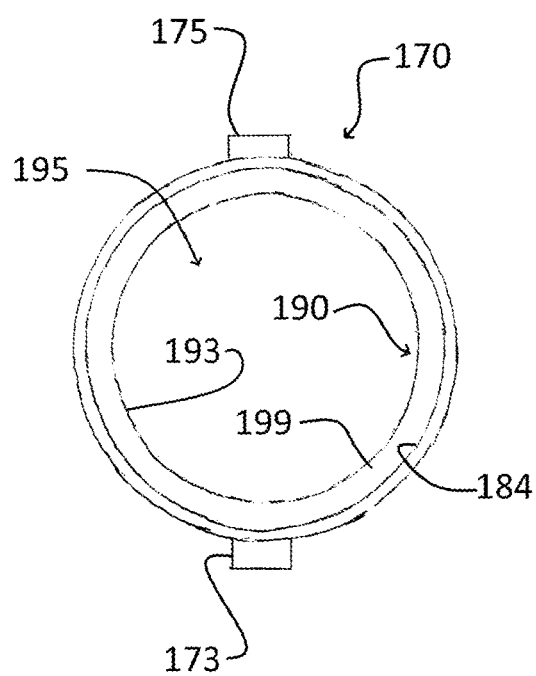
FIG. 13 is a top view of the sleeve housing in FIG. 12.

The sleeve housing 170 is shown by itself in FIGS. 12 and 13 and has a continuous wall 178 instead of sides. As shown in FIG. 12, the sleeve housing 170 has a top opening 172 at a top edge 182 and a bottom opening 174 at a bottom edge 180. An inside surface 184 of the sleeve housing 170 is coated with a non-stick material to aid the release of the bun container 100 after baking. Adjacent to the bottom opening 174 and spaced from the bottom edge 180 is a guide and ejection ring wall 190 that is an uninterrupted wall that is perpendicular to the inside surface 184 and extends inwardly from the sleeve housing 170. The guide and ejection ring wall 190 terminates at a profile edge 193 to define a central opening 195. The profile edge 193 closely matches the profile of the side wall 126, specifically the sealing region 130. An upward facing surface 199 of the ring wall 190 is also coated with a non-stick material. The profile of the male mold 124 and profile edge 193 can be any shape. The male mold 124 can be straight or tapered. Irrespective of the profile of the male mold 124, the cross-sectional profile or shape must be consistent along the entire length. Because the sleeve housing 170 is a continuous wall 178 and the ring wall 190 is attached to the inside, the bun container 100 can only be removed through the top opening 172. Therefore, any shape is contemplated that allows the pocketed bun container 100 to be removed through the top opening 172. A sealing surface 196 is opposite the upward facing surface 199 that contacts a seal 160 on the mold base 120 when the sleeve housing 170 is mated to the mold base 120. The seal 160 is shown in FIGS. 9A and 9B and is retained where the male mold 124 meets the base plate 122. The seal 160 can be retained with tension, adhesive, mechanically, or by other means. The seal 160 is resilient and is compressed when the sleeve housing 170 is mated, shown in FIG. 9B. For proper sealing, the amount of compression between the sealing surface 196 and seal 160 should be uniform around the profile of the male mold 124. The seal does not have to be airtight but does have to seal sufficiently to prevent leakage of the batter or liquid dough.

The sleeve housing 170 also contains rotator cogs 173, 175 that are used by process equipment (described in further detail below) to invert the sleeve housing 170 (and eject the bun container 100) after baking. Once the sleeve housing 170 is mated to the mold base 120, the sleeve style pallet 116 is formed, where the sealing surface 196 seals against the seal 160. This forms a chamber 171 to receive liquid dough or batter with the top opening 172 being an open top to that chamber.

Figure 9C:
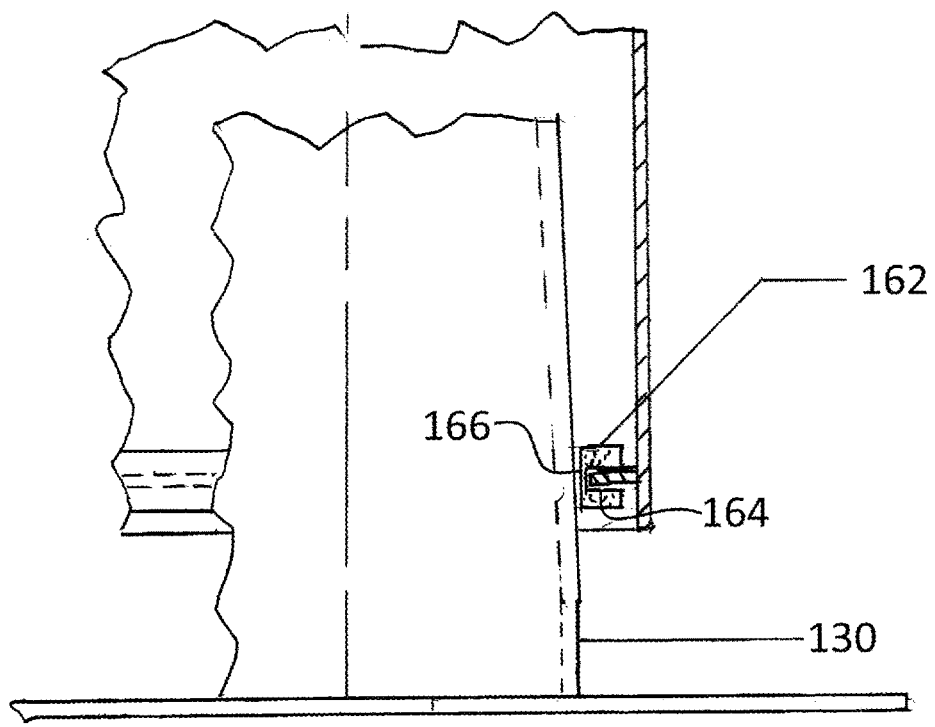
FIG. 9C is a partial section view 9 of the pallet in FIG. 9A with an alternate seal design.
Figure 9D:
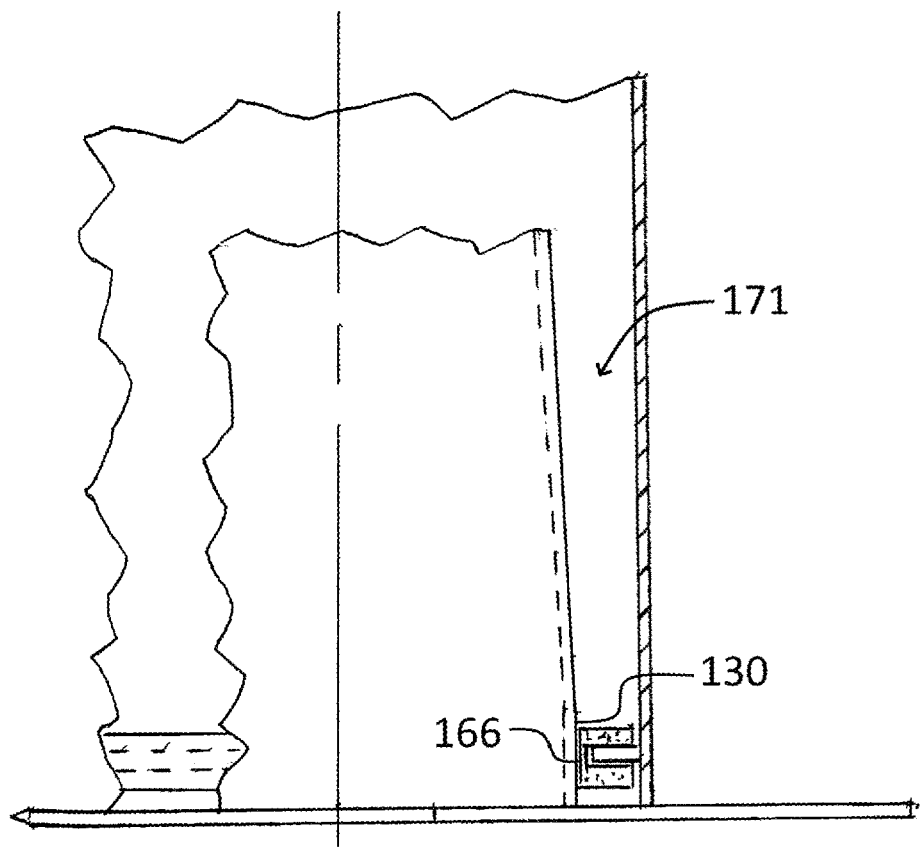
FIG. 9D is a partial section view 9 of the pallet in FIG. 9B with an alternate seal design.

Another version uses a U-shaped seal 162 that is retained on the sleeve housing 170, specifically on the ring wall 190. This is shown in FIGS. 9C and 9D. The U-Shaped seal 162 has a groove 164 where the ring wall 190 resides and a seal face 166 that compresses against the sealing region 130. This is shown in FIG. 9D.

Figure 11:
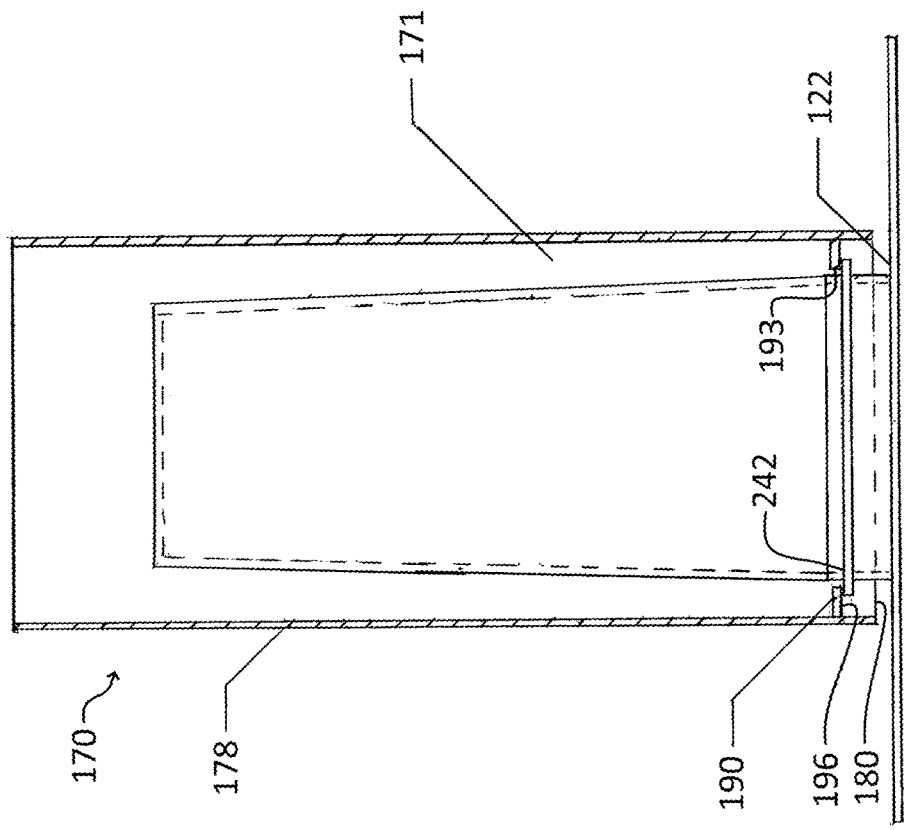
FIG. 11 is a side view of an assembled pallet showing the mold base in FIG. 10 and section of a sleeve housing.
Figure 10:
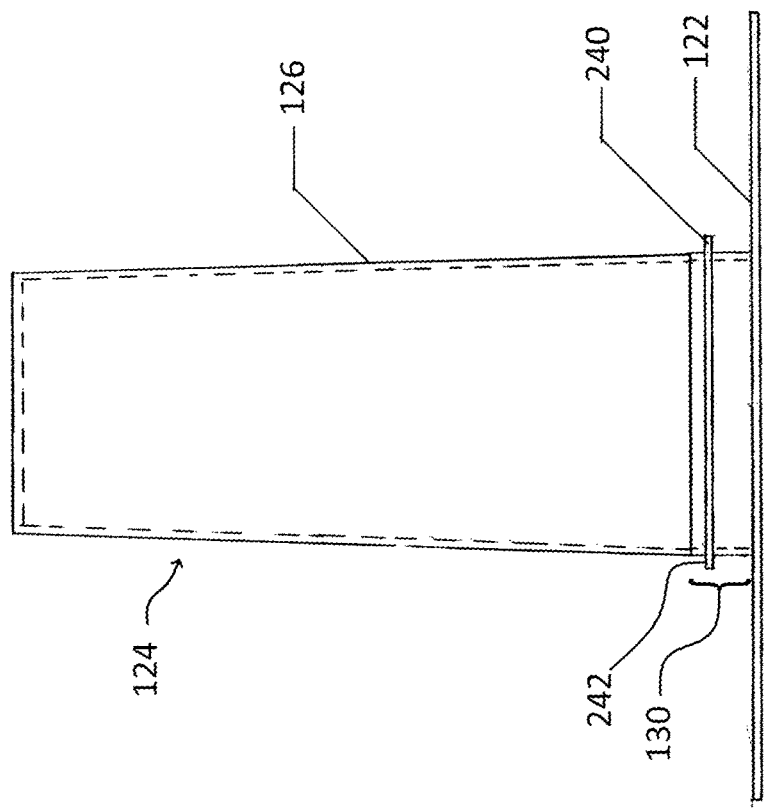
FIG. 10 is a side view of a mold base having a fixed seal ring on the male mold.

Another seal design is shown in FIGS. 10 and 11. Instead of a resilient seal (such as seals 160, 162), a seal ring 240 is affixed to the male mold 124, specifically on the non-tapered sealing region 130. The seal ring 240 has an upper surface 242 that contacts the sealing surface 196 when the sleeve housing 170 is mated to the mold base 120, shown in FIG. 11. Because the seal ring 240 is rigid, the sleeve housing 170 stops moving vertically when the seal ring 240 meets the ring wall 190. To ensure proper sealing of the upper surface 242 to the sealing surface 196, the bottom edge 180 does not contact the base plate 122. Gravity can hold the sleeve housing 170 to the mold base 120, but it is contemplated that clamps, latches, or other mechanisms (such as biasing devices 34, 36) are used to hold the housing to the base and ensure positive contact between the upper surface 242 and sealing surface 196. Gaps shown in the FIGS, such as the gap between the profile edge 193 and scaling region 130 and gap between the bottom edge 180 and base plate 122 are exaggerated for the purposes of clarity.

Figure 15:
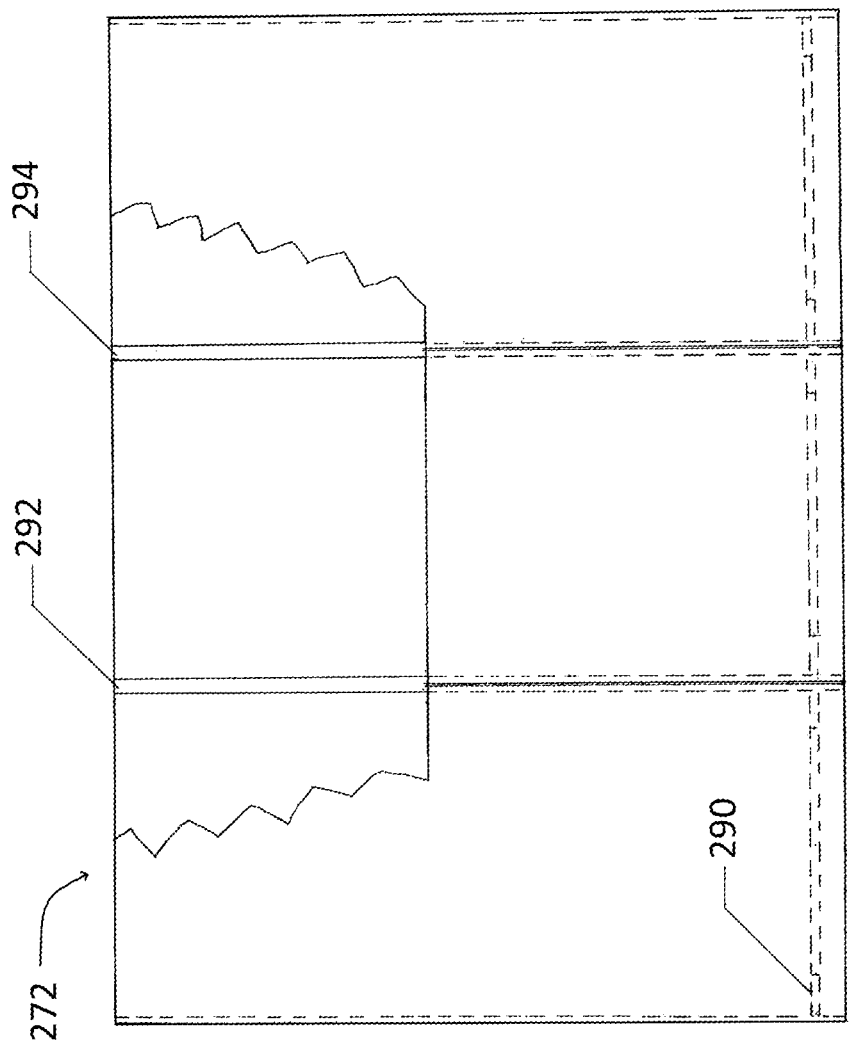
FIG. 15 is a side view of the sleeve housing in FIG. 14.
Figure 14:
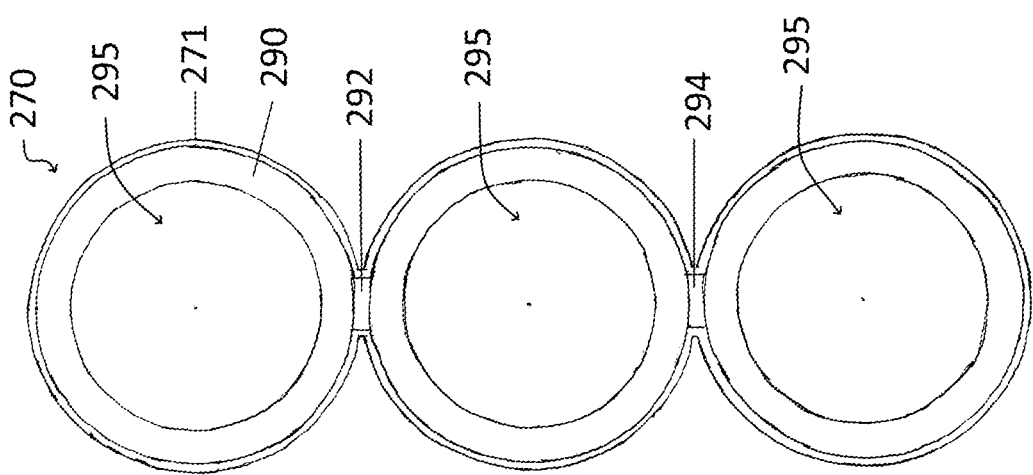
FIG. 14 is a top view of a sleeve housing having multiple cavities.

A multi-cavity sleeve housing 270 is shown in FIGS. 14 and 15. As shown, there are three cavities joined together, but different quantities of cavities are contemplated. The multi-cavity sleeve housing 270 mates with a multi-cavity mold base (not shown) that is structured like mold base 120, with the difference being that a multi-cavity mold base would have corresponding male molds 124 that are spaced to match up to the cavities in the housing 270. The multi-cavity sleeve housing 270 has a continuous wall 271, a top opening 272, and an ejection ring wall 290. The ejection ring wall 290 has an opening 295 for each male mold. Above the ejection ring wall 290, the individual cavities are in fluid communication with each other by slots 292, 294. The slots 292, 294 may not extend completely to the ejection ring wall 290. At slots 292, 294, the continuous wall 271 is close to but spaced from the opposing portion of the continuous wall 271. The ejection ring wall 290 extends across between opposing portions of the continuous wall 271 in the slots 292, 294. When the housing 270 is mated to a complementary mold base and filled with dough/batter, the continuous wall 271 surrounds all of the male molds, allowing the dough/batter to flow across to cover all male molds inside the housing. Once baked, the baked bun containers are joined by a web of cooked dough that allows them to either be separated at a packing station 230 or kept together for easier processing and then separated by the end user.

The process 10 is similar between clamshell style pallet 16 and sleeve style pallet 116 with portions of the process 10 that are different being noted herein. As shown in FIG. 1, the process 10 utilizes one or more conveyors. The main conveyor 200 starts with the assembled pallet 16, 116 at the start 201 (shown on the far left side of FIG. 1). As shown, the assembled pallet 16, 116 is positioned with the male mold 24, 124 protruding vertically from the base plate 22, 122 and mated to the housing 70, 170, forming a chamber 171 with an open top. The mold base 20, 120 may be separate from the conveyor or integrated. If separate, the mold base 20, 120 is added or attached to the conveyor at the start 201. If the housing was not already present at the start 201, the mold base 20, 120 then travels to a housing assembly station (not shown) that lowers the clamshell housing 70 or sleeve housing 170 down to the mold base 20, 120 to make the pallet 16, 116 having a chamber 171 with an open top.

The pallet 16, 116, as assembled, then proceeds to a fill station 206 where liquid dough or batter is added through the top opening 102, 172 to make a filled pallet 208. The liquid dough or batter must be sufficiently liquid to be dispensed into the pallet 16, 116 and fill in the allowed volume. Next, an inspection station 209 confirms the proper amount of liquid dough or batter is present by measuring the height of the liquid dough in the pallet. Inspection can be done through laser, optical, vision, ultrasonic, or other sensing technology that can measure the fill level of the assembled pallet 16, 116. Next, the filled pallet 208 passes through an oven 210 to bake the liquid dough or batter into the pocketed bun container 100. After baking, the pallet 16, 116 is inspected at a second inspection station 212. The pallet 16, 116 then proceeds through a cooling station 236 that may include fans, refrigeration, or an extended portion of the conveyor to allow the pallet 16, 116 and baked pocketed bun container 100 to cool. Next, the pallet 16, 116 containing the pocketed bun container 100 enters a transfer station 220. The transfer station 220 separates the pocketed bun container 100 and clamshell housing 70 or sleeve housing 170 from the mold base 20, 120 by pulling up in a vertical direction. The mold base 20, 120 then proceeds to a cleaning station 232 that uses vacuum, compressed air, brushes, or other means to remove any crumbs or other unwanted debris. The pocketed bun container 100 is now separate from the male mold 24, 124 using the half rings 90 or ring 190. The process 10 for removing the pocketed bun container 100 from the clamshell housing 70 is different than the sleeve housing 170. For the clamshell housing 70, the sides 72, 74 are kept in the closed position until they are moved above a finish bun conveyor 224. At that time, they are moved to the open position (as shown in FIG. 4) and the pocketed bun container 100 falls onto the finish bun conveyor 224. For the sleeve housing 170, the housing is moved over the finish bun conveyor 224 and inverted using the rotator cogs 173, 175 so the bun container 100 falls out through the top opening 172. In other words, the top opening 172 is placed below the bottom opening 174 when the housing is inverted. The transfer station 220 then places the clamshell housing 70 or sleeve housing 170 back on a mold base 20, 120 at a mating station 234. For the clamshell housing 70, the sides 72, 74 are moved to the closed position using the actuating wings 73, 75 and it is placed over the mold base 20, engaging the sides 72, 74 with the guide blocks 46. The clamshell housing 70 is then moved to a position where the bottom edges 80 are in contact with the base plate 22 and sealing surfaces 96 are aligned with sealing region 30. For the sleeve housing 170, it is placed over the mold base 120 to contact the bottom edge 180 and base plate 122 and the sealing surface 196 is in biased contact with the seal 160. Additional process equipment to receive, remove, or otherwise handle the pocketed bun container 100 is contemplated. The bun containers 100 are packed at a packing station 230.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A system for baking an edible container, comprising:
a mold base having a base plate, a male mold having a side wall protruding vertically from said base plate and terminating at an end wall above said base plate, said side wall having a consistent cross-sectional profile between said base plate and said end wall;
a housing formed from a continuous wall extending between a bottom edge and a top edge of said housing, said continuous wall having a mold-facing surface, a ring wall affixed thereto and located between said top edge and said bottom edge, said ring wall protruding inwardly from said mold-facing surface and terminating at a profile edge to define a central opening, said profile edge complementary to said side wall;
said housing having a top opening at said top edge and a bottom opening at said bottom edge;
a resilient seal on said mold base where said male mold meets said base plate, when said housing is mated to said mold base, said resilient seal is compressed between said base plate and a sealing surface on said ring wall; and
when said housing is mated to said mold base, said male mold is received by said bottom opening and said central opening and said ring wall is sealed to said male mold to form a chamber with an open top.

2. The system of claim 1, wherein said resilient seal is secured to said mold base.

3. The system of claim 1, further comprising a seal ring affixed to said male mold, said seal ring having an upper surface for sealing to said ring wall when said housing is mated to said mold base.

4. The system of claim 3, wherein said bottom opening is spaced from said base plate when said housing is mated to said mold base.

5. The system of claim 1, wherein said chamber is defined by the volume between said male mold above said ring wall and said mold-facing surface between said top edge and said ring wall.

6. The system of claim 1, where said mold base has a plurality of male molds protruding from said base plate, said ring wall having a complementary number of central openings to receive said plurality of male molds, when said housing is mated to said mold base, said continuous wall encircles said plurality of male molds.

7. The system of claim 1, wherein said housing contains rotator cogs affixed to said continuous wall and protruding radially outward therefrom.

8. The system of claim 1, wherein said base plate having a biasing member spaced from said male mold and moveable between a resting position and a biased position, said biasing member moved from said resting position to said biased position when said mold base is mated to said housing, said housing is separable into a first side and a second side, said first side pivotable with respect to said second side between an open position and a closed position, said closed position defined by longitudinal edges on said first side sealed to longitudinal edges on said second side to form said continuous wall.

9. A system for baking an edible container, comprising:
a mold base having a base plate, a male mold having a side wall protruding vertically from said base plate and terminating at an end wall above said base plate, said side wall having a consistent cross-sectional profile between said base plate and said end wall;
a housing formed from a continuous wall extending between a bottom edge and a top edge of said housing, said continuous wall having a mold-facing surface, a ring wall affixed thereto and located between said top edge and said bottom edge, said ring wall protruding inwardly from said mold-facing surface and terminating at a profile edge to define a central opening, said profile edge complementary to said side wall;
said housing having a top opening at said top edge and a bottom opening at said bottom edge;
a resilient seal retained on said housing, said ring wall located in a groove on said seal, said seal having a seal face located opposite said groove, when said housing is mated to said mold base, said seal face is sealed to a sealing region on said male mold; and
when said housing is mated to said mold base, said male mold is received by said bottom opening and said central opening and said ring wall is sealed to said male mold to form a chamber with an open top.

10. The system of claim 9, wherein said sealing region is adjacent to said base plate.

11. The system of claim 9, where said mold base has a plurality of male molds protruding from said base plate, said ring wall having a complementary number of central openings to receive said plurality of male molds, when said housing is mated to said mold base, said continuous wall encircles said plurality of male molds.

12. A system for baking an edible container, comprising:
a mold base having a base plate, a male mold having a side wall protruding vertically from said base plate and terminating at an end wall above said base plate, said side wall having a consistent cross-sectional profile between said base plate and said end wall;

a housing formed from a continuous wall extending between a bottom edge and a top edge of said housing, said continuous wall having a mold-facing surface, a ring wall affixed thereto and located between said top edge and said bottom edge, said ring wall protruding inwardly from said mold-facing surface and terminating at a profile edge to define a central opening, said profile edge complementary to said side wall;

said housing having a top opening at said top edge and a bottom opening at said bottom edge;

said base plate having a biasing member spaced from said male mold and moveable between a resting position and a biased position, said biasing member moved from said resting position to said biased position when said mold base is mated to said housing, said housing is separable into a first side and a second side, said first side pivotable with respect to said second side between an open position and a closed position, said closed position defined by longitudinal edges on said first side sealed to longitudinal edges on said second side to form said continuous wall; and when said housing is mated to said mold base, said male mold is received by said bottom opening and said central opening and said ring wall is sealed to said male mold to form a chamber with an open top.

13. The system of claim 12, where said mold base has a plurality of male molds protruding from said base plate, said ring wall having a complementary number of central openings to receive said plurality of male molds, when said housing is mated to said mold base, said continuous wall encircles said plurality of male molds.

14. The system of claim 12, further comprising a resilient seal on said mold base where said male mold meets said base plate, when said housing is mated to said mold base, said resilient seal is compressed between said base plate and a sealing surface on said ring wall.

15. The system of claim 14, wherein said resilient seal is secured to said mold base.

16. The system of claim 12, further comprising a resilient seal retained on said housing, said ring wall located in a groove on said seal, said seal having a seal face located opposite said groove, when said housing is mated to said mold base, said seal face is sealed to a sealing region on said male mold.

17. The system of claim 16, wherein said sealing region is adjacent to said base plate.

18. The system of claim 12, further comprising a seal ring affixed to said male mold, said seal ring having an upper surface for sealing to said ring wall when said housing is mated to said mold base.

19. The system of claim 18, wherein said bottom opening is spaced from said base plate when said housing is mated to said mold base.

* * * * *